United States Patent Office 3,349,724
Patented Oct. 31, 1967

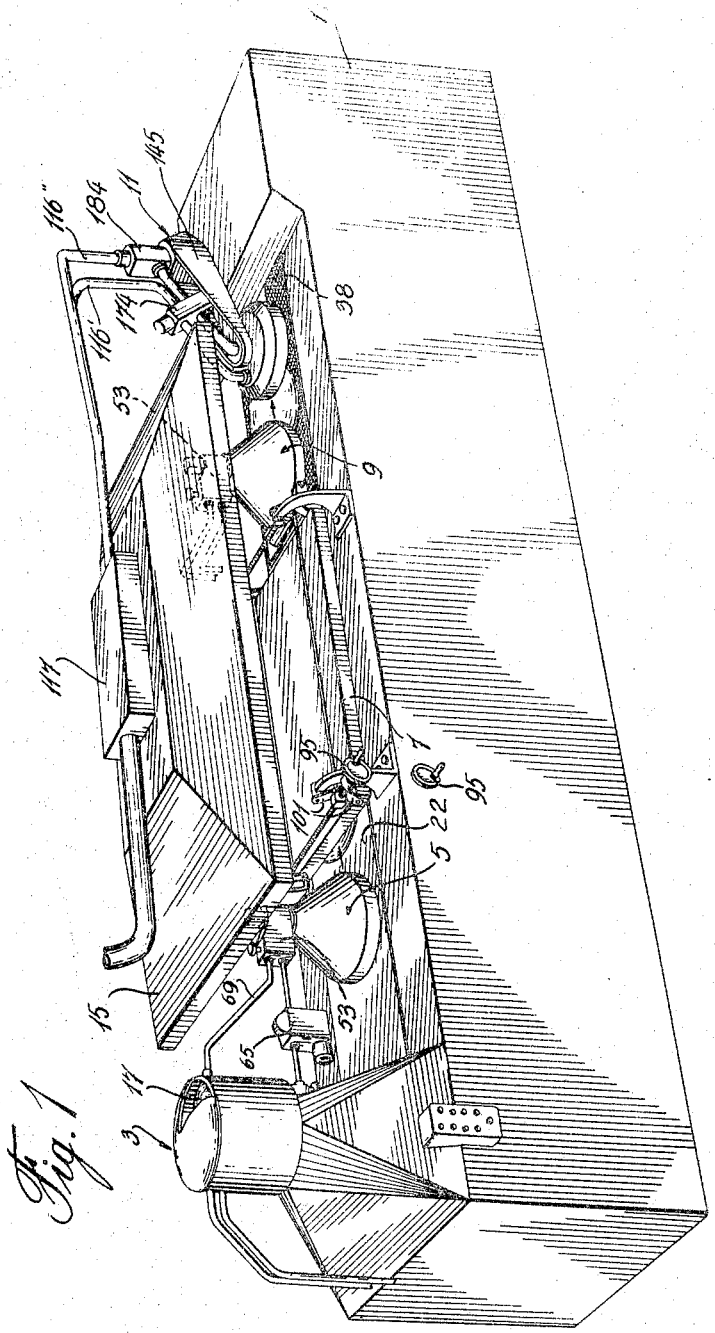

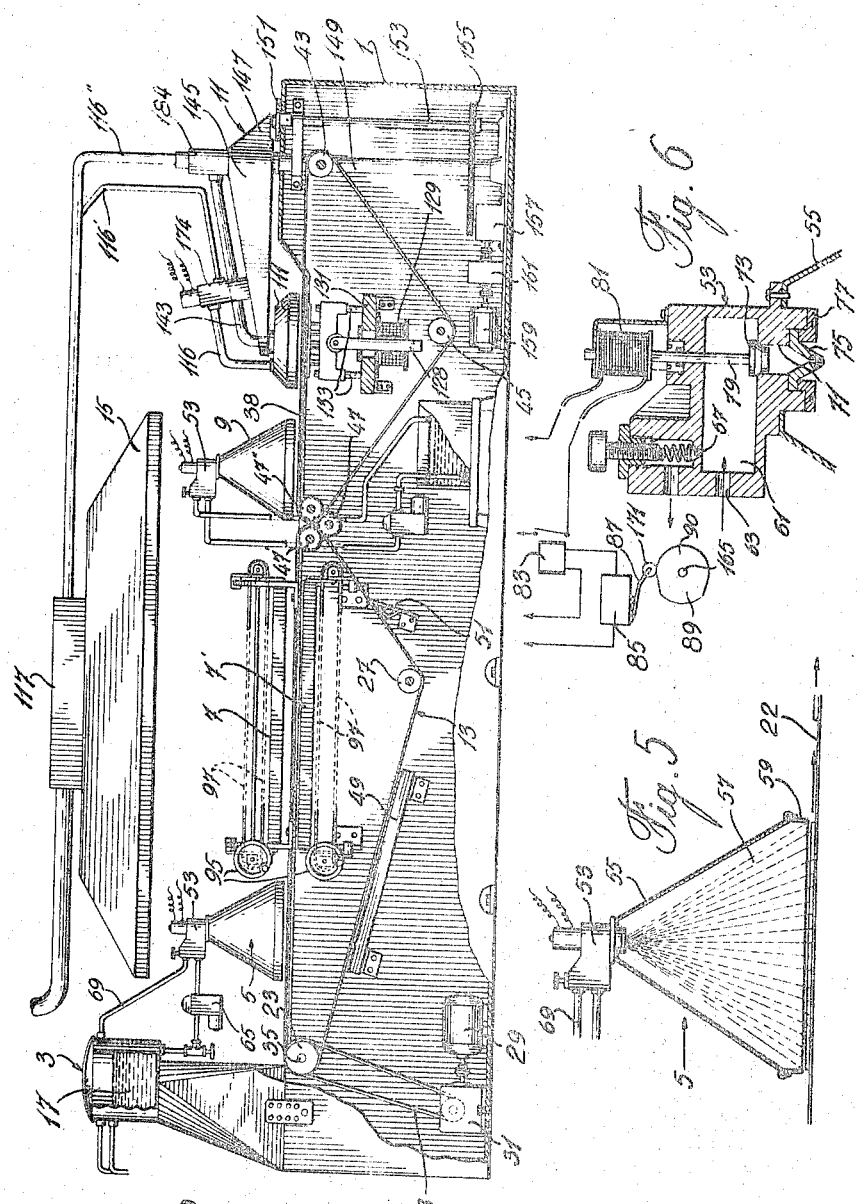

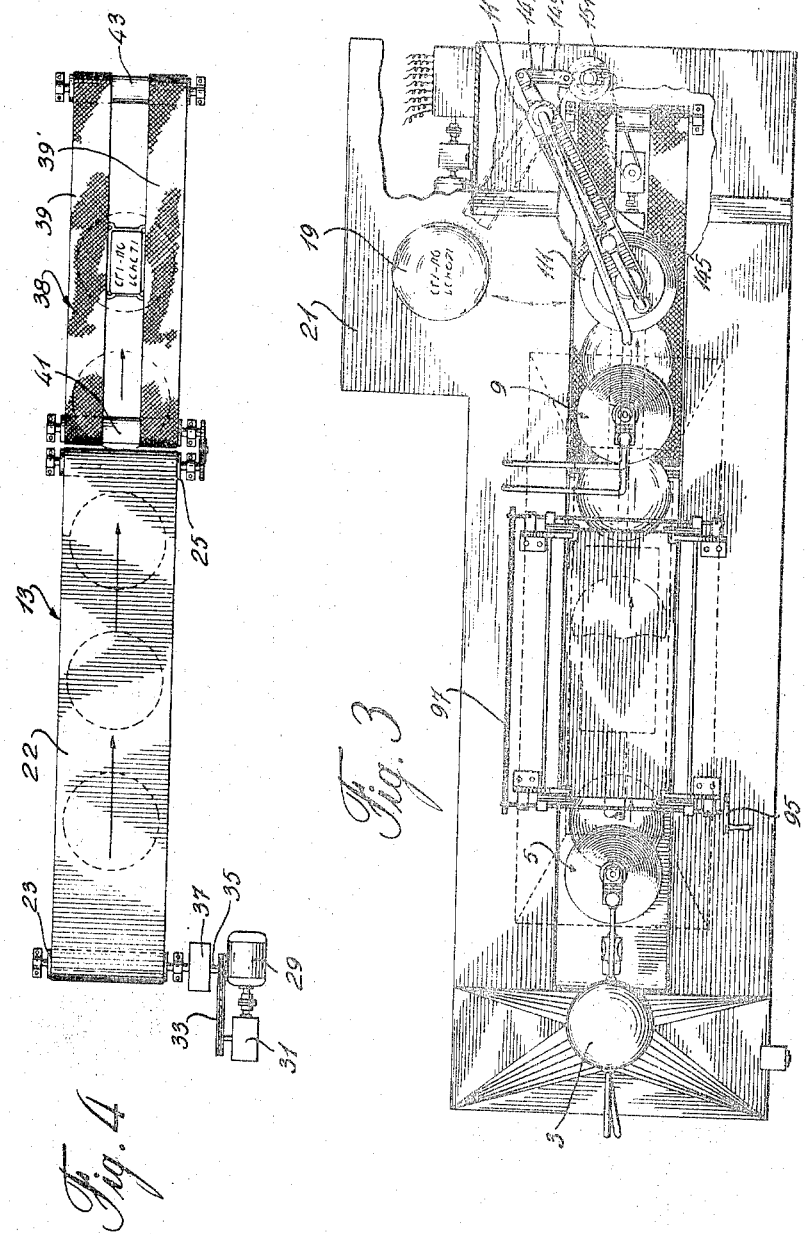

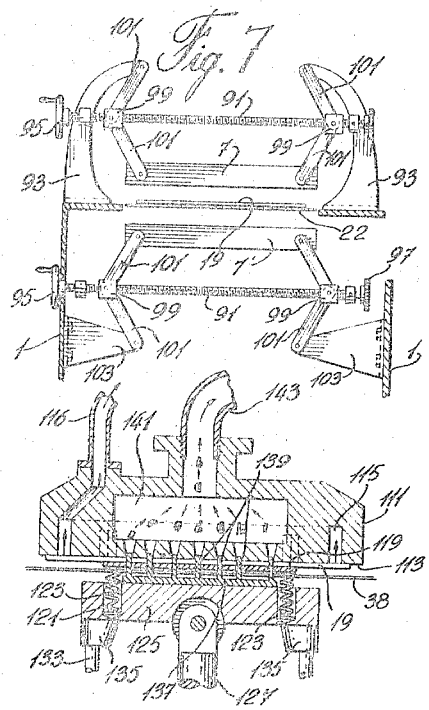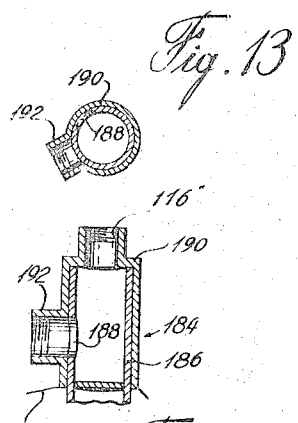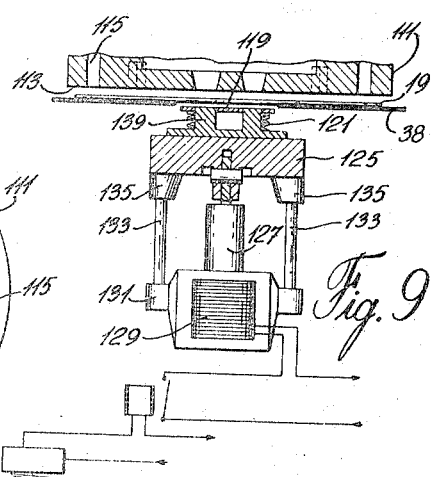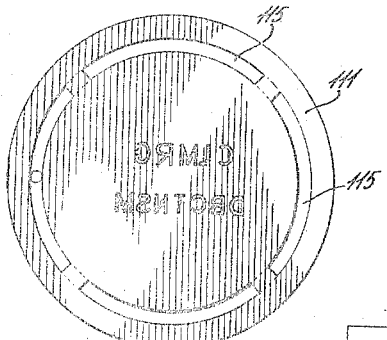

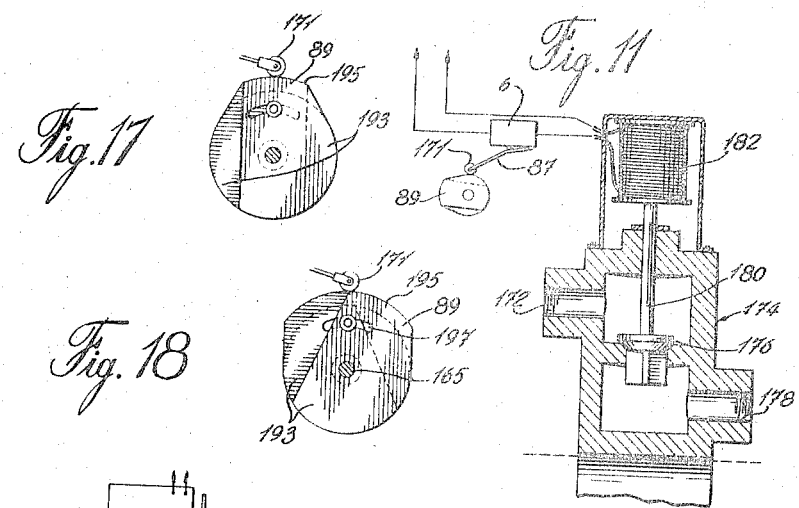
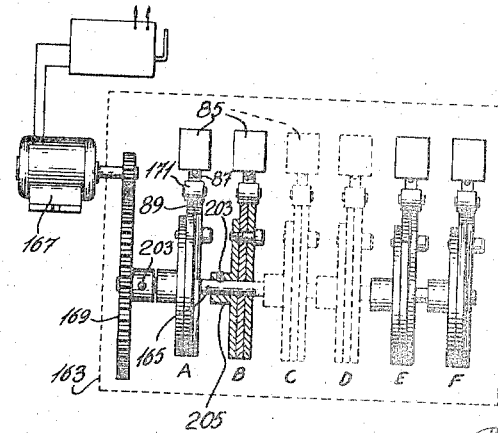
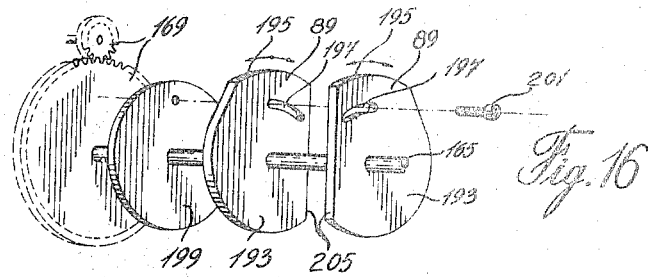

3,349,724
PANCAKES OR THE LIKE PASTRY AUTOMATIC MAKING MACHINE
Louis Tavan, 289 Bloomfield Ave., Outremont, Quebec, Canada
Filed June 24, 1965, Ser. No. 466,691
8 Claims. (Cl. 107—4)

ABSTRACT OF THE DISCLOSURE

This machine cooks pancakes or like pastries on a conveyor which advances them to a combined marking and removing device which forms a trade mark or other indicia on the pancake or pastry. Liquid dough is sprayed on the conveyor in the form of pancake or flat pastry which is advanced past the heating elements, and a seasoning device for application of butter and other seasonings, to the removing device.

The present invention relates to an automatically operated machine for making pancakes or the like generally flat pastries.

In the conventional method of making pancakes, the dough is spread on a cast iron hot plate by means of a wood or metal plate handled in the manner of a rake. As soon as the pancake is cooked on one side, it is turned over by means of a wooden plate so that it may be cooked on the other side. The time for cooking a pancake, by a skillful cook, is about 40–45 seconds. This method, although quite suitable for an average production, does not lend itself to continuous mass production. The pancakes thus obtained are all different from one another and of an irregular outline which, although not eliminating the possibility of using automatic packaging methods, make them rather uncertain.

The thickness of the pancakes is also uneven so that they are easily broken during handling.

Because the edges of certain pancakes are irregular, as said above, it becomes necessary to cut-off portions thereof which lead to waste.

Finally, cooking of the pancakes in two steps, one for each side thereof, increases the possibility of breaking them when they are turned over precisely because they are cooked only on one side and consequently still fairly liquid on the other side.

An object of the present invention resides in an apparatus especially designed for the manufacture and cooking of pancakes or the like pastries in a mass production manner and in a way to overcome the above-stated drawbacks.

Another object of the invention lies in providing such an automatic machine wherein the output is greater and more even than with the conventional pancake hot plate with a cooking time appreciably shorter.

Still another object of the invention resides in the provision of an automatic pancake machine wherein the thickness of the pancakes may be accurately controlled, seasoning added thereto, trade mark printed thereon and wherein they may be removed from the machine in order to be packaged, all operations done without any manual handling being necessary thus improving the sanitary conditions under which they are made, as compared to the conventional method.

The above objects of the invention may be obtained in an automatic machine made according to the invention and basically comprising a travelling conveyor which is displaceable in a predetermined direction; a pastry forming device mounted over the conveyor at the upstream end thereof; a pastry removing device mounted across the path of the conveyor at the downstream end thereof; control means to cause operation of the conveyor through a series of identical time cycles each consisting of a travelling time period of the conveyor and of an idling time period thereof; the control means including actuating means to cause operation of the forming device during the idling time periods only and to cause operation of the removing device during the travelling time periods only. Finally, another principal feature of the invention lies in that the forming and removing devices are so spaced along the conveyor that during continuous operation of the machine, the conveyor stops during the idling periods with pastries located at the devices.

Preferably, the removing device is combined with a marking device which, similarly to the forming device, operates only during the idling periods of the conveyor and prior to the start of operation of the removing device.

In the preferred form of the invention, heating of the pastries is obtained by means of heating elements on both sides of the conveyor and between the forming device and the removing device. The heating elements are adjustably mounted whereby they may be displaced relative to the conveyor and to the pastries to be cooked whereby to properly adjust the cooking temperature.

Further advantages and other objects will become apparent from the following description of a preferred embodiment of the invention having reference to the appended drawings wherein:

FIG. 1 is a perspective view of the automatic machine of the invention;

FIG. 2 is a side elevation view, with front panel cut away, of the pancake machine of the invention;

FIG. 3 is a plane view of the machine;

FIG. 4 is a plane view of the conveyor of the machine of the invention;

FIG. 5 is a side elevation view, partly shown in cross-section, of the pastry forming device;

FIG. 6 is a cross-sectional view of the injection valve of the pastry forming device with the electrical diagram included;

FIG. 7 is a side elevational view of the heating elements with adjustable means therefor;

FIG. 8 is a longitudinal cross-sectional view of the marking and removing device;

FIG. 9 is a transverse cross-sectional view of a portion of the device of FIG. 8;

FIG. 10 is a bottom view of the marking and removing device of FIG. 8;

FIG. 11 is a cross-sectional view of the vacuum control valve of the removing part of the combined marking and removing device;

FIG. 12 is a longitudinal cross-sectional view of the vacuum control valve for removing the pastry cuts from the marking part of the combined device;

FIGS. 13 and 14 are two cross-sectional views, in two different positions, of the vacuum control valve of FIG. 12;

FIG. 15 is a longitudinal side elevation view of the cam control means;

FIG. 16 is an exploded view of a control cam;

FIGS. 17 and 18 are side elevation views of a control cam intended to illustrate two different adjustments thereof.

With particular reference to FIGS. 1, 2 and 3, the invention generally comprises a metal base 1 in the form of a table over which are mounted the different parts making up the automatic machine. These comprise an elevated liquid dough reservoir 3 feeding into a pastry forming device 5 followed by the heating elements 7, 7' at the outlet of which is a seasoning device 9 and finally the combined marking and pastry removing device 11.

Beneath devices 5, 9 and 11 and at the level of the top of base 1, there is provided the pastry conveying means 13 more particularly illustrated in FIG. 4 and to be described in details hereinafter.

An odor and smoke removing hood 15 of conventional type is disposed above the heating elements 7, 7' as well as the pastry forming device 5 and the seasoning device 9.

Now with reference to FIG. 2, liquid dough 17 in reservoir 3 is fed into forming device 5 where a predetermined portion is sprayed over conveyor 13 in the form of a pancake, or the like flat pastry, which is then conveyed between the two hot plates 7, 7' for cooking and thereafter passed underneath the seasoning device 9 where the necessary butter and other such seasonings are sprayed on to finally be directed underneath the marking and removing device 11 whence the finished pastry is directed to a side table 21 (see FIG. 3) where it is meant to be packaged or otherwise taken away.

The conveying means 13 (FIG. 4) comprises a first conveyor 22, preferably a metallic belt, winding around a driving roller 23 and a driven roller 25, while an idler roller 27 is disposed over the lower strand to retain proper tension in the said first conveyor.

Axle 35 over which the driving roller 23 is secured is driven by a drive 33 connected to a motor 29 through a speed reducer 31. An electric clutch 37 applies or cuts-off power from driving assembly 29, 31, 33 in a manner to be described hereinafter.

Conveying means 13 also comprises a second conveyor formed of two belts 39, 39' mounted in spaced parallel relationship over a driving roller 41 and a driven roller 43 with an idler roller 45 mounted over the lower strands to ensure proper tension during operation.

First and second conveyors 22–39, 39' are interconnected in such a way as to travel in the same direction and at the same speed. This may be obtained by mounting three identical gears 47, 47', 47" in the manner shown in FIG. 2, that is with two gears 47', 47" at the corresponding ends of rollers 25 and 41 and a third gear 47 in between, the latter being mounted for rotation on the side walls of base 1, for instance.

The belts making up the first and second conveyors are preferably made of metal, such as wire mesh.

An auxiliary heating element 49 may be mounted in base 1, in proximity to the lower strand of conveyor 22 to keep it at a suitable temperature.

A scraper 51 may also be mounted in base 1 to scrape the top surface of conveyor 22.

The pastry forming device 5 (FIGS. 5 and 6) is constituted by an injection valve 53 and a diffusing cone 55 mounted around the outlet thereof to contain and, if necessary, guide the spray 57 of dough as it is applied on the conveyor 22. An apron 59, of the desired shape, may be removably added at the bottom of the diffusing cone 55. This apron may for instance have such a shape as to cause the formation of serrations along the outer edge of the formed pancake.

As shown in FIG. 6, the injection valve 53 is formed of a body defining a chamber 61 for the reception of liquid dough under pressure. Chamber 61 has an inlet 63 connected to the output of a gear pump 65 (FIG. 2) drawing the liquid dough 17 from the bottom of reservoir 3. An adjustable one-way over pressure valve 67 ensures that the pressure in chamber 61 is kept at a constant value. In the case of an over pressure, the excess liquid dough is driven, through one-way valve 67, back into reservoir 3 by means of a return conduit 69.

Chamber 61 also has an outlet passage 71 opening into the diffusing cone 55 and closed, at the inner end thereof, by a valve head 73 while a diffusing nozzle 75 is removably mounted at the outlet end of passage 71 as by means of a nut 77 screwed on the valve body.

Valve head 73 is retained in closed position by the pressure in chamber 61 and is mounted at the end of a soft iron rod 79 which also acts as a core for an electromagnet 81 energizable when a magnetic relay 83 is brought into closed position when a micro switch 85 is actuated by a spring lever 87 pressed by the bulging part 89 of a cam B, reference to which will be made again later. It will be understood that whenever bulging part 89 upwardly biases spring 87, micro switch 85 closes to energize the magnetic relay 83 to, in turn, energize coil 81 forcing valve head 73 away from its seat to thus open passage 71 for liquid dough to be discharged therethrough. It will also be understood that the peripheral length of bulging part 89 determines the quantity of liquid dough to be injected.

As mentioned previously, the heating elements 7, 7' are mounted on either side of conveyor 22 and independent manually adjustable control means (shown in FIG. 7) is provided for each of elements 7, 7' to adjust the relative positions thereof to conveyor 22.

The adjusting means for each element comprises an operating rod 91 at each end of each element, reversely threaded and mounted for rotation on base 1, for the lower element rods and on suitable supports 93 for the upper element rods. A handle 95 serves to rotate the rods 91 of each element, it being understood that they are interconnected by means of a chain drive 97 perhaps best shown in FIG. 3.

Two blocks 99 are threadedly mounted at each end of each rod 91 for relative displacement.

To each block corresponds a pair of links 101, one end of which is pivotally mounted on the block. The other end of one link of the pair is pivotally connetced to a heating element while the other end of the other link is pivotally joined to the end of a bracket 103 for the lower links and to the supports 93 for the upper links. Brackets 103 are fixedly secured to the side wall of the base 1.

As will readily be understood from the above explanation, rotation of the rods 91 will move blocks 99 relative to one another thus displacing the corresponding heating element relative to conveyor 22.

In this manner, an appropriate temperature for cooking the pastries may readily be obtained and retained.

The seasoning device 9 (FIG. 2) is optional and will usually serve to spread butter over the pancakes but may also be adapted for spreading other ingredients. It is identical to the pastry forming device 5 except that the ingredient reservoir in this case is located in base 1 but otherwise it is the equivalent of the pastry forming device 5.

Reference has been made previously to a combined marking and pasty removing device 11 but it should be understood that basically only a removing device is necessary since the pastries need not be marked with the manufacturer's indicia. In such a case the removing device would comprise an upper member 111 (FIG. 8) having a flat pastry applying surface 113 disposed in facing relation with the second conveyor 38. A peripheral groove 115 is formed around member 111, being connected to an air exhaust or vacuum ventilator 117 (see FIGS. 1 and 2) by means of a conduit 116.

Below conveyor 38 is a lower member 119 adapted to apply pancake 19 against surface 113 (see FIG. 8) at a predetermined time. It will be understood that if at that moment, conduit 116 is connected to vacuum, the vacuum thus obtained in groove 115 will retain pancake 19 against surface 113 so that upper member 111 may be moved away to remove the pancake from the conveyor area.

Lower plate 119 is mounted at the ends of springs 121, the other ends of which lie in bores 123 provided on a table 125.

A vertical supporting column 127 is pivotally connected at the upper end thereof to the centre and underneath table 125. Column 127 is made of soft iron and is receivable as a core in a magnetic coil 129 (see FIGS. 2 and 9) secured to a bracket 131 fixed to base 1. Projecting upwardly from the upper surface of bracket 131 are a series of posts 133 slidably received in suitable apertures through downward projections 135 of table 125 whereby to guide table 125 in its vertical displacement when coil 129 is energized. The energizing circuit is the same as that described above in connection with the injection valve 53 of FIG. 6.

At a predetermined time, as will be explained later, table 125 is moved upwardly with lower member 119 resiliently applying a pancake 19 against lower face 113, as aforesaid.

In the preferred form of the invention, the removing device is combined with a marking device and for this purpose, a marking plate 137 is mounted between lower member 119 and the upper surface of table 125 (see FIGS. 8 and 9). From the upper surface of the marking plate 37 project a series of cutting prongs 139 and lower member 119 as well as upper member 111 are provided with suitable apertures capable of receiving and guiding such cutting prongs. It will be understood that the prongs 139 are arranged and distributed so as to form the required indicia.

The holes in upper member 111 are preferably cone-shaped and open into a chamber 141 connected to vacuum (ventilator 117) by means of a conduit 143 as shown in FIG. 8. The pastry cuttings resulting from the action of prongs 139 are withdrawn into chamber 141 and through conduit 143 by the action of the vacuum. Thus, the desired indicia made up of a series of closely disposed and suitably arranged holes through the pancake is obtained.

As best illustrated in FIGS. 2 and 3, upper member 111 is fixed to the outer end of a rocking arm 145, the inner end of which is secured to the top of a freely rotatable shaft 148. Arm 145 has a rearward extension 147 pivotally connected to a link 149 (right of FIG. 3) the other end of which is pivotally secured at the periphery of a disc 151 mounted at the top of an axle 153 driven into rotation by a chain drive 155 connected to a speed reducer 157 deriving its driving power from a motor 159 with an electric clutch 161 interconnecting motor 159 and speed reducer 157.

Thus, rotation of axle 153 by the drive of motor 159 will cause rotation of disc 151 and reciprocation of link 149 with rocking of arm 145 as best gathered from FIG. 3.

Electric clutch 161 has the same purpose as that of clutch 37 of conveyor 13: to control the rocking movement of arm 145.

Vacuum conduit 116 (FIG. 8) connects at the outlet 172 (FIG. 11) of a control valve 174 (FIGS. 2 and 11) mounted on rocking arm 145. Valve 174 has a valve head member 176 controlling air passage between outlet 172 and inlet 178 to which a vacuum line 116′ is connected, the latter leading to vacuum pump 117. Valve head member 176 is provided at the end of a stem 180 made of soft iron and acting as the core of a coil 182. This coil is to be energized in the same manner as coils 81 and 129 of injection valve 53 (FIG. 6) and combined device 11 (FIG. 9).

Vacuum conduit 143 (FIG. 8) which opens into chamber 141 of member 111 for the removal of pastry waste is connected to a further vacuum control valve 184 illustrated in FIGS. 12, 13 and 14. This valve comprises an open-top and closed-bottom nipple 186 secured coaxially over rocking arm 145 and having an opening 188 through the wall thereof. Slidably mounted over nipple 186 is a sleeve 190 the upper end of which communicates with vacuum line 116″ (FIG. 2) connecting with vacuum pump 117, and with the inner space of nipple 186.

At the level of opening 188, sleeve 190 has a lateral piping branch 192 to which is connected vacuum conduit 143. The position of opening 188 of nipple 186 is such that branch 192 is out of registry therewith when in the position of FIG. 13, that is when the upper member 111 of the removing device stands above conveyor 13 and registers therewith when in the position of FIG. 14, that is when the upper member 111 stands above side table 21 (FIG. 3).

Thus, this vacuum control valve 184 is mechanically actuated in such a way that during a complete cycle of rocking arm 145, it draws out the pastry cuttings or waste from chamber 141 only when the pancake is away from the conveyor 13.

In FIG. 15 is illustrated a coordinating system 163 for the various devices above described comprising conveyor 13 (composed of conveyors 22 and 38), pastry forming device 5, optionally the seasoning device 9 and the removing device optionally combined with the marking device to form the combined marking and removing device 11 aforesaid.

The coordinating system 163 is a cam means formed of a plurality of cams A, B, C, D, E, F mounted on a common axle 165 adapted to be brought into continuous rotation by means of a motor 167 through a gear drive 169. Each cam is in the form of a composite flat disc having a bulging portion 89 adapted to press on the roller 171 at the end of a leaf spring 87 to operate a micro switch 85 in the manner indicated during the above description of the injection device 53 of FIG. 6.

A first cam, such as cam A, will acutate a micro switch 85, through a suitable circuit, in such a way as to couple and uncouple the electric clutch 37 (FIG. 4) to thus control movement of conveyors 22 and 38. Thus, this conveyor control means causes operation thereof through a series of identical time cycles each consisting of a travelling time period, when clutch 37 is operative, and an idling time period, when clutch 37 is inoperative. During a complete cycle of cam A, each pancake advances a predetermined constant distance. It is during the idling or rest period that the pancake forming device 5, the seasoning device 9 and the lower member 137 of the removing device must be operated. For this reason, it will be understood that it is necessary that the seasoning device 9 as well as the combined device 11 be so located along the conveyor, in relation to forming device 5, that when the conveyor stops, the pancakes will be located underneath device 5 or at the said predetermined distance therefrom or a multiple thereof at the locations of devices 9 and 11.

Another cam, cam B for instance, corresponding to injection valve 53 of FIG. 6 must have the bulge 89 thereof so located on shaft 165 as to cause energization of coil 81 and injection of liquid dough during the rest period of the conveyor.

As mentioned above, the length of bulge 89 is adjustable in a manner to be more fully described hereinbelow. With such an arrangement, the injection time may be varied to suit particular requirements.

A third cam, cam C for instance, is mounted on shaft 165 to cause energization of coil 129 of the lifting means for the lower member 119. Simultaneously, a fourth cam such as cam D of FIG. 11 is to be energized to allow groove 115 of upper member 111 to be connected to vacuum through vacuum lines 103, 116 and 116′. However, the bulge 89 of cam D must be longer than that of cam C since the pancakes 19 must be retained against upper element 111 until the latter has reached the position over packaging table 21 during rocking movement of arm 145. At that time, cam D must become inoperative whereby to deenergize coil 182 and allow pancake 19 to drop. At the same time, it will be remembered that the vacuum control valve 185 (FIG. 12) will temporarily be connected to the vacuum source to thus draw out the pastry cuttings.

A fifth cam, cam E for instance, can serve to couple and uncouple clutch 161 (FIG. 2) to thus bring arm 145 into its rocking cycle. This cam comes into operation at least mostly during the travelling period of conveyor 13 and after lower plate member 119 (FIG. 8) has brought a pancake against the lower face 113 of upper member 111 and the pancake is secured thereto.

Cam E must thus be so adjusted as to cause uncoupling of electric clutch 161 when the removing device is over conveyor 13.

A sixth cam (such as F) serves for the actuation of the seasoning device 9 and is altogether similar to cam B of the injection valve 53 and also operates during the idling or rest period of conveyor 13.

These various cams are preferably of the type illustrated in FIGS. 16, 17 and 18 where they will be seen to comprise a pair of flat discs 193 each having the aforementioned bulge 89 defining an arcuate peripheral land 195, all lands being of equal radii and coaxial with shaft 165. To each land 195 is a slot 197, arcuate in outline and coaxial with shaft 165. Slots 197 of discs 193 are intended to at least partially overlap as perhaps best seen in FIGS. 17 and 18. Finally, a straight circular disc 199 is provided which is to be applied against the first mentioned disc 193. The diameter of the latter disc corresponds to or is less than that of the unbulging portions of discs 193.

The three discs 193, 199 are held in fixed relationship by means of a screw 201 extending across slots 197 and threading into disc 199.

The assembly is retained against rotation on shaft 165 by means of a set screw 203 driven through a central flange 205 of disc 199 (see FIG. 15).

Preferably, each of discs 193 is cut along a chord 205 on either side of shaft 165 as shown in FIG. 16.

In this manner, and as best illustrated in FIGS. 17 and 18, the total land 195 or total width of bulge 89 may be varied simply by unscrewing screw 201 and sliding the two discs 193 relatively to one another. In this manner, it will be understood that the cam action can be appreciably increased or reduced to suit particular conditions. For instance, it may be necessary to have a very short bulge in the case of the seasoning device 9 whereas vacuum control valve 174 requires a relatively long bulge since a pancake must be retained against upper element 111 during half a cycle of the rocking arm 145.

Although a specific embodiment of the invention has just been described, it will be understood that various modifications may be made thereto without departing from the spirit thereof, the scope of which is set forth in the appended claims.

I claim:
1. In an automatic machine for making pancakes or the like pastries, the combination comprising:
  (a) a travelling conveyor displaceable in a predetermined direction;
  (b) a pastry forming device over said conveyor at the upstream end thereof;
  (c) a combined pastry marking and removing device across the path of said conveyor at the downstream end thereof and including a marking part and a removing part;
  (d) control means to cause operation of said conveyor through a series of identical time cycles each consisting of a travelling time period of the conveyor and of an idling time period thereof;
  (e) said control means including actuating means to cause operation of said forming device and of the marking part of said combined device during said idling time periods and operation of the removing part of said combined device during said travelling time periods;
  (f) said devices so spaced along said conveyor that, during operation of the machine, said conveyor stops during said idling periods with pastries located at said devices.

2. A combination as claimed in claim 1 wherein heating elements are provided, on both sides of said conveyor and between said forming device and said removing device, to cook said pastries, and adjustable means to mount said elements whereby they may be displaced relative to the conveyor and pastries to be cooked.

3. In an automatic machine for making pancakes or the like pastries, the combination comprising:
  (a) electrically operable travelling conveyor means displaceable in a predetermined direction and including a switch operable to stop movement of the conveyor means;
  (b) an electrically operable pastry forming device mounted over said conveyor means at the upstream end thereof and including a liquid dough injection valve and a switch operable to actuate said valve to cause injection of liquid dough over said conveyor to form a pastry;
  (c) an electrically operable combined pastry marking and removing, including a marking part and a removing part, mounted across the path of said conveyor means at the downstream end thereof and including a switch operable to actuate the marking part of said combined device to mark pastries and a further switch operable to actuate the removing part of said combined device to remove pastries from said conveyor means;
  (d) control means including a cam rotatable to operate said conveyor means switch to force said conveyor means to go through a series of identical time cycles each consisting of a travelling time period of the conveyor means and an idling time period thereof;
  (e) said control means including cams rotatable to operate the switches of said forming device and the marking part of said combined device during said idling periods and operation of the switch of the removing part of said combined device during said travelling time periods;
  (f) said devices so spaced along said conveyor means that, during operation of the machine, said conveyor means stops during said idling periods with pastries located at said devices.

4. A combination as claimed in claim 3 wherein said forming device is formed with a chamber for the reception of liquid dough under pressure; said chamber having a dough outlet passage; an injection valve for closing one end of said passage and responsive to operation of said forming device switch; a diffusing nozzle at the other end of said passage, facing said conveyor means, for spraying dough over said conveyor means and a diffusing cone surrounding said nozzle and projecting in the direction of said conveyor means to contain and guide said sprayed liquid dough.

5. A combination as claimed in claim 3 wherein heating elements are provided, on both sides of said conveyor means and between said forming device and said combined device, to cook said pastries, and adjustable means to mount said elements whereby they may be displaced relative to the conveyor means and pastries to be cooked.

6. A combination as claimed in claim 5 wherein each cam is formed of a pair of flat discs freely mounted on said shaft, each formed with a bulging actuating part having a circular outline of equal radius; means to hold said discs one against the other with said outlines at least in partial register; said latter means adjustable to lengthen or shorten the total length of said outlines in said partial register, and further means to secure said discs on said shaft for rotation therewith.

7. In an automatic machine for making pancakes or the like pastries, the combination comprising:
  (a) electrically operable travelling conveyor means displaceable in a predetermined direction and including a switch operable to stop movement of the conveyor means;
  (b) an electrically operable pastry forming device mounted over said conveyor means at the upstream end thereof and including a liquid dough injection valve and a switch operable to actuate said valve to cause injection of liquid dough over said conveyor means to form a pastry;

(c) an electrically operable combined pastry marking and removing device, including a marking part and a removing part mounted across the path of said conveyor means at the downstream end thereof and including a switch operable to actuate the marking part of said combined device to mark pastries and a further switch operable to actuate the removing part of said combined device to remove pastries from said conveyor means;
(d) a rotatable control shaft;
(e) a cam secured to said shaft to operate said conveyor switch to cause said conveyor means to go through a series of identical operating cycles each consisting of a travelling time period of the conveyor means and an idling time period thereof;
(f) further cams secured to said shaft to operate the switches of said forming device and of the marking part of said combined device for operation thereof during said idling periods and to operate the switch of the removing part of said combined device for operation thereof during said travelling periods;
(g) said devices so spaced along said conveyor means that, during operation of the machine, said conveyor means stops during said idling periods with pastries located at said devices.

8. In an automatic machine for making pancakes or the like pastries, the combination comprising:
(a) electrically operable travelling conveyor means displaceable in a predetermined direction and including a switch operable to stop the conveyor means movement, said conveyor means having a portion thereof presenting two parallel horizontal transversely spaced strands;
(b) an electrically operable pastry forming device mounted over said conveyor means at the upstream end thereof and including a liquid dough injection valve and a switch operable to actuate said valve to cause injection of liquid dough over said conveyor means to form a pastry;
(c) an electrically operable combined pastry marking and removing device, including a marking part and a removing part, mounted across the path of said conveyor means at the downstream end thereof and including a switch operable to actuate the marikng part of said combined device to mark pastries and a further switch operable to actuate the removing part of said combined device to remove pastries from said conveyor means;
(d) heating elements disposed on each side of said conveyor means and between said forming device and said combined device, to cook said pastries, and adjustable means to mount said elements whereby they may be displaced relative to the conveyor means and pastries to be cooked;
(e) control means including a cam rotatable to operate said conveyor switch to force said conveyor means to go through a series of identical time cycles each consisting of a travelling time period of the conveyor means and an idling time period thereof;
(f) said control means including further cams rotatable to operate the switches of said forming device and the marking part of said combined device during said idling periods and operation of the switch of the removing part of said combined device during said travelling time periods;
(g) said devices being so spaced along said conveyor that, during operation of the machine, said conveyor means stops during said idling periods with pastries located at said devices;
(h) said combined device comprising:
  (a') a pastry removing member having a pastry applying surface in facing relation with and above said conveyor means;
  (b') a source of vacuum and means to bring said vacuum to said surface through said member to hold a pastry thereon during a first part of said travelling time period and to cut-off said vacuum, to allow dropping of said pastry, during the remaining part of the period;
  (c') a lower member below said conveyor means, between said strands, across said pastry applying surface and means to move said lower member toward said surface during said idling time period to apply a pastry thereagainst;
  (d') a rotatable vertical shaft;
  (e') a horizontal supporting arm fixed at one end to said shaft and having said removing member secured at the other end thereof;
  (f') means to rock said shaft to cause said removing member to move away from said conveyor means during the said first part of said travelling time and move it back over said conveyor means during said remaining part;
  (g') a chamber formed in said upper member and means to place said chamber in communication with said vacuum source;
  (h') said surface and said lower member having corresponding holes distributed therethrough and defining a predetermined pattern;
  (i') said means to move said lower member including a block over which said lower member is mounted;
  (j') a plate located between said block and said lower member and having a series of upstanding punching prongs of a size and distribution to fit into said holes whereby said prongs may punch holes through the pastries to leave the said pattern while the punched parts of the pastry are carried away under the action of the vacuum.

References Cited

UNITED STATES PATENTS 3,034,455    5/1962    Roth.
3,105,497    10/1963    Petri et al.

WALTER A. SCHEEL, *Primary Examiner.*

J. SHEA, *Assistant Examiner.*